United States Patent
Sakata et al.

(10) Patent No.: US 9,264,573 B2
(45) Date of Patent: Feb. 16, 2016

(54) IMAGE FORMING SYSTEM AND IMAGE FORMING APPARATUS THAT FORWARD DOCUMENT BOX OF MOVED USER

(71) Applicant: Kyocera Document Solutions Inc., Osaka (JP)

(72) Inventors: Hiromi Sakata, Osaka (JP); Keisaku Matsumae, Osaka (JP); Ryusuke Nakatani, Osaka (JP); Shinichi Nakanishi, Osaka (JP); Michiko Tashiro, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/559,120

(22) Filed: Dec. 3, 2014

(65) Prior Publication Data

US 2015/0156367 A1    Jun. 4, 2015

(30) Foreign Application Priority Data

Dec. 3, 2013    (JP) .................................. 2013-250520

(51) Int. Cl.
*H04N 1/21* (2006.01)
*H04N 1/00* (2006.01)

(52) U.S. Cl.
CPC ......... *H04N 1/2175* (2013.01); *H04N 1/00244* (2013.01); *H04N 1/00347* (2013.01); *H04N 2201/007* (2013.01); *H04N 2201/0094* (2013.01); *H04N 2201/218* (2013.01)

(58) Field of Classification Search
CPC .. G06K 15/40; G06K 15/401; G06K 15/4005
See application file for complete search history.

(56) References Cited

U.S. PATENT DOCUMENTS

| 2003/0133152 | A1* | 7/2003 | Matsueda | 358/1.15 |
| 2006/0048234 | A1* | 3/2006 | Imaizumi et al. | 726/27 |
| 2014/0078551 | A1* | 3/2014 | Haba et al. | 358/1.15 |

FOREIGN PATENT DOCUMENTS

| JP | H05-103188 A | 4/1993 |
| JP | H08-084206 A | 3/1996 |
| JP | 2011-066772 A | 3/2011 |

* cited by examiner

Primary Examiner — Benny Q Tieu
Assistant Examiner — Haris Sabah
(74) Attorney, Agent, or Firm — James W. Judge

(57) ABSTRACT

An image forming system includes a plurality of image forming apparatuses and a group management server. The plurality of image forming apparatuses each include a document-box management unit. The document-box movement processing unit transmits a command to at least one of a first image forming apparatus assigned to a group before the movement and a second image forming apparatus assigned to a group after the movement, the command causing movement of a document box of the moved user from the first image forming apparatus to the second image forming apparatus. The document-box management unit in at least one of the first image forming apparatus and the second image forming apparatus accepts the command. The document-box management unit forwards the document box of the moved user from the first image forming apparatus to the second image forming apparatus.

7 Claims, 2 Drawing Sheets

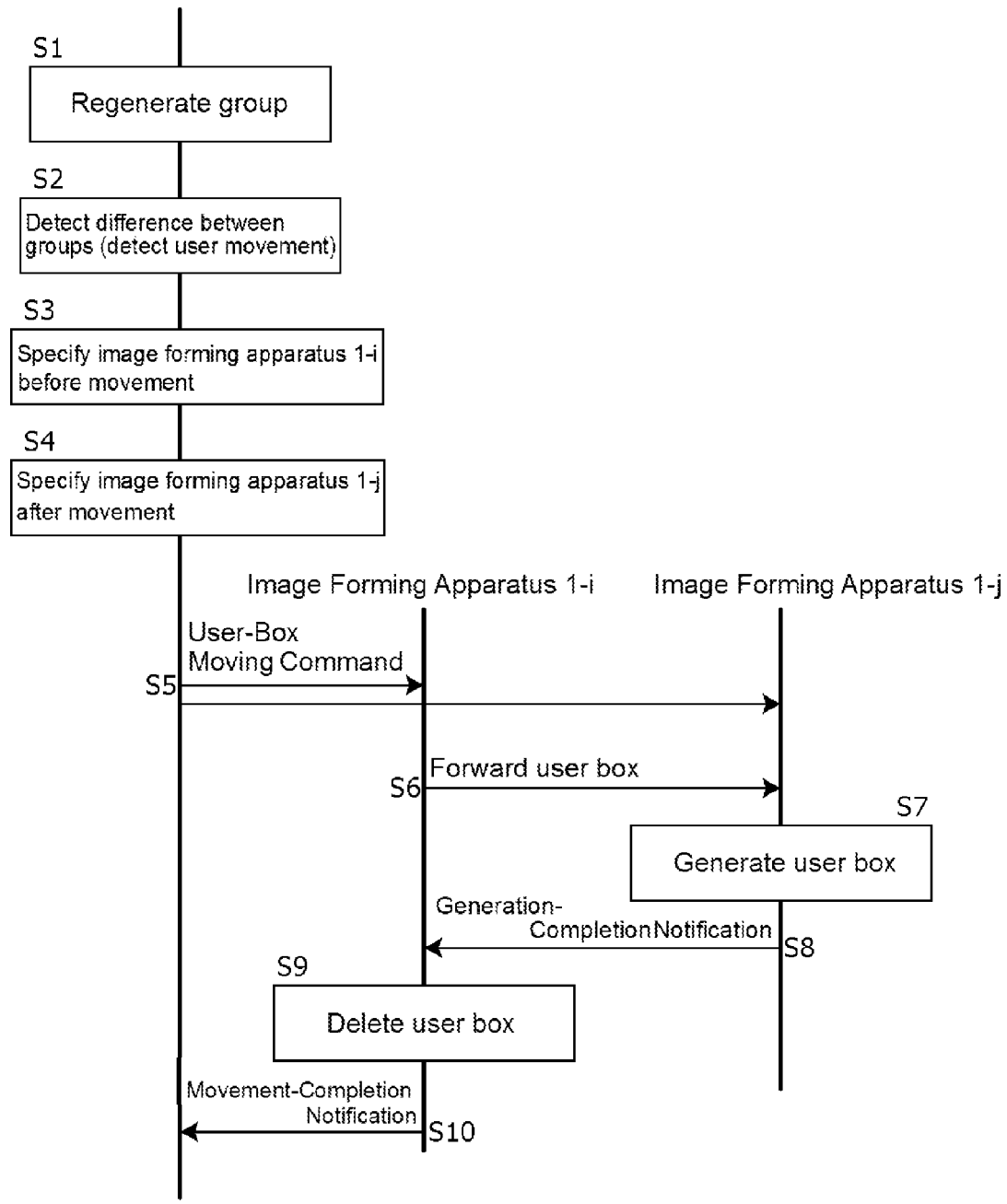

IMAGE FORMING SYSTEM AND IMAGE FORMING APPARATUS THAT FORWARD DOCUMENT BOX OF MOVED USER

INCORPORATION BY REFERENCE

This application is based upon, and claims the benefit of priority from, corresponding Japanese Patent Application No. 2013-250520 filed in the Japan Patent Office on Dec. 3, 2013, the entire contents of which are incorporated herein by reference.

BACKGROUND

Unless otherwise indicated herein, the description in this section is not prior art to the claims in this application and is not admitted to be prior art by inclusion in this section.

When a user uses an image forming apparatus in an organization such as an office with a plurality of image forming apparatuses, the user uses the image forming apparatus nearest to the user's desk or the image forming apparatus of the department to which the user belongs. Accordingly, when the position of the desk is changed or the user is moved because of change of the belonging department, the image forming apparatus that the user uses is also changed.

In some image forming apparatus, a document box can be generated for each user. The user can save a document file or similar file obtained by image reading in the document box of the user.

Accordingly, when the image forming apparatus that the user uses is changed due to movement of the user, there is the need to simply move the document box of the user.

Regarding the movement of the document file, there is a technique that moves the file in a first folder to a second folder, which is preliminarily set, using administrative rights when a file is, for example, added or updated in the first folder on a file sharing service.

SUMMARY

An image forming system according to one aspect of the disclosure includes a plurality of image forming apparatuses and a group management server. The plurality of image forming apparatuses each include a storage device and a document-box management unit. The document-box management unit is configured to execute generation and deletion of a document box for each user in the storage device. The group management server includes a group generating unit and a document-box movement processing unit. The group generating unit generates a plurality of groups by categorizing users with a predetermined condition, assigns one of the plurality of image forming apparatuses to the generated group, and detects a user moved from one group to another group in the plurality of groups. When the group generating unit detects a user moved from one group to another group in the plurality of groups, the document-box movement processing unit transmits a command to at least one of a first image forming apparatus and a second image forming apparatus, the first image forming apparatus being assigned to a group before the movement, the second image forming apparatus being assigned to a group after the movement, the command causing movement of a document box of the moved user from the first image forming apparatus to the second image forming apparatus. When the document-box management unit in at least one of the first image forming apparatus and the second image forming apparatus accepts the command, the document-box management unit forwards the document box of the moved user from the first image forming apparatus to the second image forming apparatus.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 2 describes movement of a document box in the image forming system according to the one embodiment.

DETAILED DESCRIPTION

Figure 1:
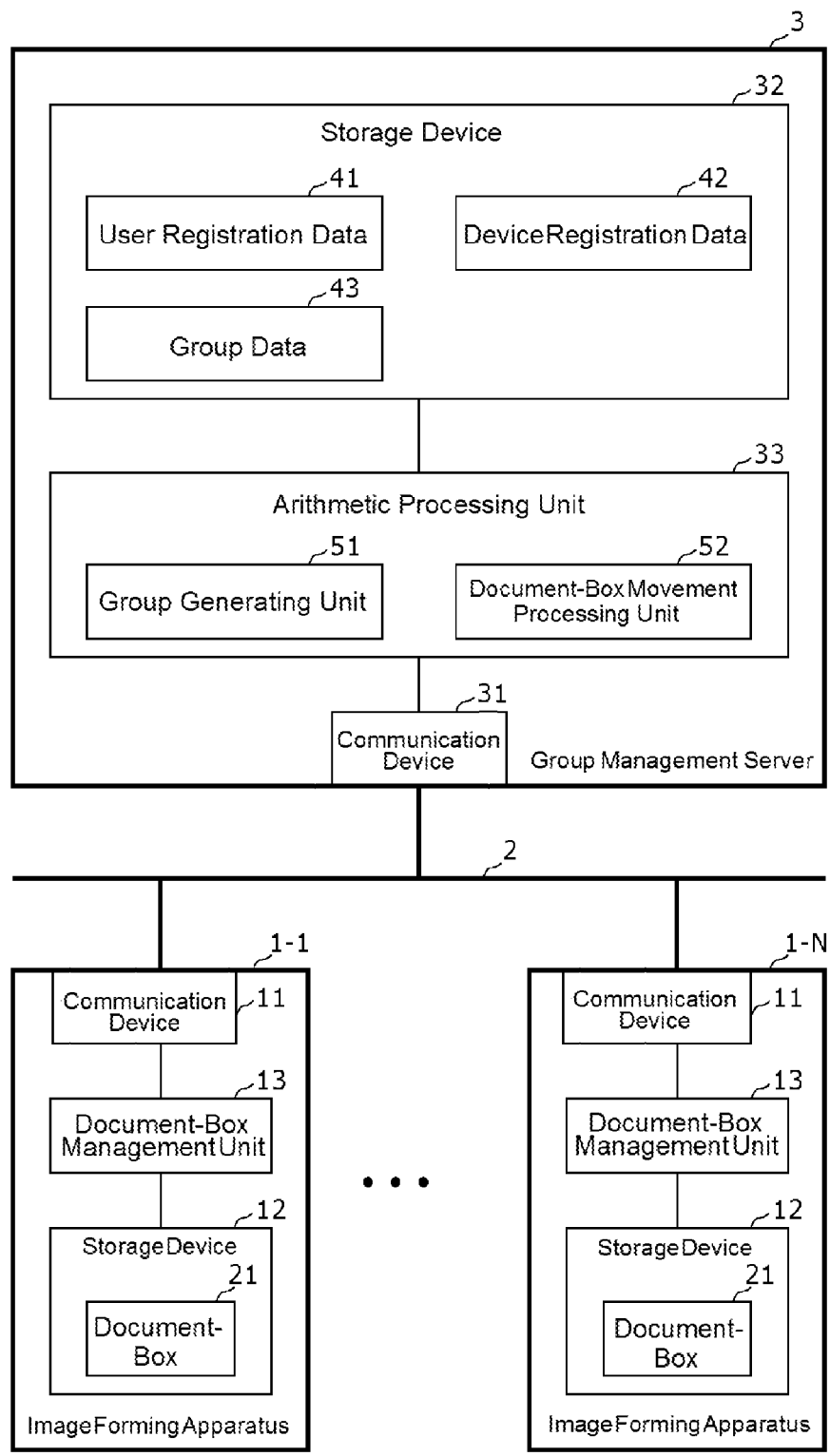
FIG. 1 illustrates a configuration of an image forming system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure based on the accompanying drawings.

Embodiment 1

FIG. 1 illustrates a configuration of an image forming system according to an embodiment of the disclosure. In the system illustrated in FIG. 1, a plurality of image forming apparatuses 1-1 to 1-N (N>1) connects to a network 2. The network 2 connects to a group management server 3.

In Embodiment 1, the image forming apparatuses 1-1 to 1-N are a printer, a multi-functional peripheral, a facsimile device, a scanner device, or similar device.

The image forming apparatus 1 includes a communication device 11, a storage device 12, and a document-box management unit 13.

The communication device 11 is a device that can connect to another device such as the group management server 3 via the network 2 and can perform data communication with a predetermined communication protocol.

The storage device 12 is a non-volatile storage device such as a hard disk drive and a non-volatile memory. To the storage device 12, a document box 21 is set for saving a document (document file) of a user for each user. The document of the user is, for example, the image data of the document image optically read from the original document by a built-in image reading device (not illustrated), the image data of the document image received by a built-in facsimile device (not illustrated), the image data generated from page description language (PDL) data received from a host device (not illustrated), or similar data. The document of the user is saved as a portable document format (PDF) file, a joint photographic experts group (JPEG) file, or similar file.

The document-box management unit 13 is achieved by, for example, a built-in computer (not illustrated) or similar method. The document-box management unit 13 can execute generation and deletion of the document box 21 for each user in the storage device 12, and further executes storage and deletion of the document of the user on the document box 21.

When accepting a command described later from the group management server 3, the document-box management unit 13 forwards the document box of the user specified by the command from an image forming apparatus 1-*i* including this document-box management unit 13 to another image forming apparatus 1-*j*. Alternatively, the document-box management unit 13 forwards the document box of the user specified by the command from the image forming apparatus 1-*i* specified by the command to the image forming apparatus 1-*j* including this document-box management unit 13.

The group management server 3 includes a communication device 31, a storage device 32, and an arithmetic processing unit 33.

The communication device 31 is a device that connects to the network 2 and can perform data communication with the image forming apparatuses 1-1 to 1-N via the network 2.

The storage device 32 is a non-volatile storage device such as a hard disk drive and a non-volatile memory. The storage device 32 stores user registration data 41, device registration data 42, and group data 43.

The user registration data 41 includes attribute information of a registered user. The attribute information of the registered user includes the department to which the user belongs, a desk position, a work type, usage frequency information of the image forming apparatus, and similar information.

The device registration data 42 includes attribute information of the image forming apparatuses 1-1 to 1-N. The attribute information of an image forming apparatus 1-*p* includes position information of the installation position of the image forming apparatus 1-*p*, type information of the function provided with the image forming apparatus 1-*p*, and similar information.

The group data 43 includes identification information of a user group generated by a group generating unit 51 described later, identification information of a user who belongs to the user group, and identification information of an image forming apparatus 1-*q* (an image forming apparatus used by the user who belongs to the user group) associated with the user group.

The arithmetic processing unit 33 is a computer that has a central processing unit (CPU), a read only memory (ROM), a random access memory (RAM), and similar member. The arithmetic processing unit 33 loads the program stored in the ROM or the storage device 32 to the RAM and executes the program in the CPU so as to function as various processing units. Here, the arithmetic processing unit 33 functions as the group generating unit 51 and a document-box movement processing unit 52.

When the group data 43 does not exist, the group generating unit 51 generates a plurality of groups by categorizing the users with a predetermined condition, assigns one of the plurality of image forming apparatuses 1-1 to 1-N to the generated group so as to generate the group data 43, and saves the group data 43 in the storage device 32.

At this time, with reference to the user registration data 41, the group generating unit 51 generates the group by categorizing the users with a predetermined condition with respect to the attribute information of the user.

For example, a group is generated for each department to which the users belong or one group of users is generated for each image forming apparatus 1-*r* where the image forming apparatus 1-*r* is the nearest image forming apparatus 1-*r* to the users. Here, the nearest image forming apparatus 1-*r* is specified by the desk position of the user and the position information of the installation positions of the image forming apparatuses 1-1 to 1-N.

Here, for this group, in the image forming apparatuses 1-1 to 1-N, a group box as the document box shared among the users belonging to the group is provided, a group address book as the address book shared among the users belonging to the group is provided, an operation panel applied in common among the users belonging to the group can be set, or a group mail box in common between the users belonging to the group is provided.

The group generating unit 51 detects the user moved from one group to another group in a plurality of groups.

Specifically, when detecting the update of the user registration data 41 or the device registration data 42, the group generating unit 51 regenerates a plurality of groups with the same predetermined condition. The group generating unit 51 detects a moved user based on the difference between the users belonging to the current respective plurality of groups and the users belonging to the respective plurality of groups obtained by the regeneration.

When the group generating unit 51 detects the user moved from one group to another group in the plurality of groups, the document-box movement processing unit 52 transmits a command to at least one (here, both) of the image forming apparatus 1-*i* and the image forming apparatus 1-*j*. The command causes movement of the document box 21 of the moved user from the image forming apparatus 1-*i* assigned to the group before the movement to the image forming apparatus 1-*j* assigned to the group after the movement. The command is transmitted to the image forming apparatuses 1-*i* and 1-*j* via the network 2 using the communication device 31.

The command includes the identification information of the moved user and the identification information of the image forming apparatus 1-*i* as the movement source and/or the image forming apparatus 1-*j* as the movement destination of the document box 21.

The following describes movement of a document box of a user in the above-described system. FIG. 2 describes the movement of the document box in the image forming system illustrated in FIG. 1.

The group generating unit 51 monitors whether or not the user registration data 41 and the device registration data 42 are updated. When detecting the update of the user registration data 41 or the device registration data 42, the group generating unit 51 regenerates a plurality of groups with the same predetermined condition (in Step S1) so as to detect a moved user (in Step S2).

Subsequently, when the group generating unit 51 detects the moved user, the document-box movement processing unit 52 specifies the image forming apparatus 1-*i* corresponding to the group to which the user belongs at present based on the group data 43 (in Step S3). Additionally, the document-box movement processing unit 52 specifies the image forming apparatus 1-*j* corresponding to the group to which the user belongs in the plurality of regenerated groups (in Step S4).

The document-box movement processing unit 52 transmits a user-box moving command (the above-described command) to the specified image forming apparatuses 1-*i* and 1-*j* (in Step S5).

In the image forming apparatus 1-*i*, when accepting the command, the document-box management unit 13 identifies the user specified by the command and transfers the document box 21 of the user to the image forming apparatus 1-*j* as the movement destination specified by the command (in Step S6).

Specifically, the document-box management unit 13 of the image forming apparatus 1-*i* transmits the attribute information (such as the name) of the document box 21 and the document (document file) saved in the document box 21 to the document-box management unit 13 of the image forming apparatus 1-*j*.

On the other hand, in the image forming apparatus 1-*j*, after accepting the above-described command, the document-box management unit 13 generates the document box 21 of the user specified by the command. When receiving the attribute information of the document box 21 and the document (document file) saved in the document box 21, the document-box management unit 13 applies the attribute information of the forwarded document box 21 to the generated document box 21 and saves the document in the forwarded document box 21 in the generated document box 21 (in Step S7).

When the generation of the document box 21 is completed in Step S7, the document-box management unit 13 of the image forming apparatus 1-*j* transmits a generation-completion notification to the document-box management unit 13 of the image forming apparatus 1-*i* (in Step S8).

When receiving the generation-completion notification, the document-box management unit 13 of the image forming apparatus 1-*i* deletes the forwarded document box 21 in the image forming apparatus 1-*i* (in Step S9) and transmits a movement-completion notification to the group management server 3 (in Step S10).

As described above, with above-described Embodiment 1, in the group management server 3, when the group generating unit 51 detects the user moved from one group to another group in a plurality of groups, the document-box movement processing unit 52 transmits the command to at least one of the image forming apparatuses 1-*i* and 1-*j*. The command causes movement of the document box 21 of the moved user from the image forming apparatus 1-*i*, which is assigned to the group before the movement, to the image forming apparatus 1-*j*, which is assigned to the group after the movement. When accepting the command, the document-box management unit 13 in at least one of the image forming apparatuses 1-*i* and 1-*j* forwards the document box 21 of the user moved from the image forming apparatus 1-*i* to the image forming apparatus 1-*j*.

This causes automatic movement of the document box 21 of the user when the image forming apparatus that the user uses is changed due to the movement of the user.

Embodiment 2

In an image forming system according to Embodiment 2, when accepting the above-described command, the document-box management units 13 of the image forming apparatuses 1-1 to 1-N determine whether or not to move the document in the document box 21 of the moved user together with the document box 21 based on the function provided with the image forming apparatus 1-*j* as the movement destination and on the attribute of the document.

For example, when the image forming apparatus 1-*j* as the movement destination is a monochrome image forming apparatus, a monochrome document is forwarded while a color document is not forwarded and remained in the image forming apparatus 1-*i* as the movement source. In this case, in the image forming apparatus 1-*i* as the movement source, the document box 21 of the user and the color document are not deleted while the forwarded monochrome document is deleted.

Here, the document-box management unit 13 of the image forming apparatus 1-*i* as the movement source may acquire the type information of the function provided with the image forming apparatus 1-*j* as the movement destination from the image forming apparatus 1-*j* as the movement destination or may acquire the type information from the group management server 3. For example, the above-described command may include the type information of the function provided with the image forming apparatus 1-*j* as the movement destination.

Here, the configuration and the operation in the image forming system according to Embodiment 2 are otherwise similar to those of Embodiment 1, and therefore will not be further elaborated here.

Embodiment 3

In an image forming system according to Embodiment 3, when the group generating unit 51 detects the moved user, the document-box movement processing unit 52 performs a predetermined query to the moved user. After detecting the confirmation by the moved user, the document-box movement processing unit 52 transmits the above-described command to at least one of the image forming apparatuses 1-*i* and 1-*j*.

For example, the document-box movement processing unit 52 displays the message of the above-described query on an operation panel (not illustrated). After the user operation indicative of the confirmation is detected on the operation panel, the document-box movement processing unit 52 transmits the above-described command to at least one of the image forming apparatuses 1-*i* and 1-*j*.

Here, the configuration and the operation in the image forming system according to Embodiment 3 are otherwise similar to those of Embodiments 1 and 2, and therefore will not be further elaborated here.

The above-described embodiments are preferred examples of the disclosure. However, the disclosure is not limited to these embodiments, and various modifications and changes of the embodiments may be made without departing from the gist of the disclosure.

For example, while in above-described Embodiments 1 to 3 the group management server 3 is provided as the apparatus separate from the image forming apparatuses 1-1 to 1-N, the group management server 3 may be incorporated in any of the image forming apparatuses 1-1 to 1-N.

The disclosure is applicable to, for example, a network system connected to a plurality of image forming apparatuses.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. An image forming system, comprising:
a plurality of image forming apparatuses; and
a group management server;
wherein the plurality of image forming apparatuses each include a storage device that stores a plurality of document-boxes for a plurality of users, and a document-box management unit that is configured to execute genera- tion and deletion of a document box of the plurality of document-boxes for each user of the plurality of users in the storage device;

the group management server includes a group generating unit, and a document-box movement processing unit;

the group generating unit generates a plurality of groups by categorizing the plurality of document boxes based upon a predetermined condition for each group, assigns each of the plurality of image forming apparatuses to a respective one of the generated groups, and detects a user of a document box of the plurality of document boxes moved from a first group to a second group in the generated plurality of groups;

when the group generating unit detects the user of the document box of the plurality of document boxes moved from the first group to the second group in the generated plurality of groups, the document-box movement processing unit transmits a command to at least one of a first image forming apparatus and a second image forming apparatus, the first image forming apparatus being assigned to the first group before the movement, the second image forming apparatus being assigned to the second group in the generated groups after the movement, the command causing movement of the document box of the moved user from the first image forming apparatus to the second image forming apparatus; and when the document-box management unit in at least one of the first image forming apparatus and the second image forming apparatus accepts the command, the document-box management unit forwards the document box of the moved user from the first image forming apparatus to the second image forming apparatus.

2. The image forming system according to claim 1, wherein: the group generating unit generates the plurality of groups by categorizing the users with the predetermined condition with respect to attribute information of the user with reference to user registration data including the attribute information of each user; and when the user registration data is updated, the group generating unit regenerates the plurality of groups under the predetermined condition to detect the moved user based on a difference between the current plurality of groups and the plurality of groups obtained by the regeneration.

3. The image forming system according to claim 1, wherein:

when the document-box management unit accepts the command, the document-box management unit determines whether or not to move a document in the document box of the moved user together with the document box based on a function provided with the second image forming apparatus and an attribute of the document.

4. The image forming system according to claim 1, wherein:

when the group generating unit detects the user moved from the first group to the second group in the plurality of groups, the document-box movement processing unit performs a predetermined query to the moved user and transmits the command to at least the one of the first image forming apparatus and the second image forming apparatus after the document-box movement processing unit detects a confirmation by the moved user.

5. The image forming system according to claim 1, wherein the group management server is incorporated in any one image forming apparatus of the plurality of image forming apparatuses.

6. An image forming apparatus, comprising:

a storage device that stores a plurality of document-boxes for a plurality of users of the apparatus as a first image forming apparatus; and a processor, wherein the processor functions to operate as a document-box management unit that is configured to execute generation and deletion of a document box of the plurality of document boxes for each user of the plurality of users in the storage device; wherein when the document-box management unit accepts a command, from a predetermined group management server, to forward the document box of the plurality of document boxes of a moved user, the document-box management unit forwards the document box of the plurality of document-boxes of the moved user, specified by the command, from the first image forming apparatus to a second image forming apparatus specified by the command; and when the predetermined group management server detects the user of the document box of the plurality of document boxes has moved from a first group to a second group in a plurality of groups generated by categorizing the plurality of the users with the plurality of document boxes and a predetermined condition, the command from the predetermined group management server is transmitted to the first image forming apparatus, being associated with the first group before the movement, and to the second image forming apparatus, being associated with the second group after the movement, and the document-box management unit of the first image forming apparatus accepts the command and forwards the document box of the moved user from the first image forming apparatus to the second image forming apparatus.

7. An image forming apparatus, comprising:

a storage device that stores a plurality of document boxes for a plurality of users of the apparatus as a first image forming apparatus; and a processor, wherein the processor functions to operate as a document-box management unit that is configured to execute generation and deletion of a document box of the plurality of document-boxes for each user of the plurality of users in the storage device;

wherein when the document-box management unit accepts a command, from a predetermined group management server, to forward the document box of the plurality of document boxes of a moved user, the document-box management unit causes forwarding of the document box of the plurality of document-boxes of the moved user, specified by the command, to the first image forming apparatus from a second image forming apparatus specified by the command; and when the predetermined group management server detects the user of the document box of the plurality of document boxes has moved from a first group to a second group in a plurality of groups generated by categorizing the plurality of the users with the plurality of document boxes and a predetermined condition, the command from the predetermined group management server, is transmitted to the first image forming apparatus, being associated with the first group before the movement, and to the second image forming apparatus, being associated with the second group after the movement, and the document-box management unit of the first image forming apparatus accepts the command and forwards the document box of the moved user from the first image forming apparatus to the second image forming apparatus.

* * * * *